United States Patent
Delrue et al.

(10) Patent No.: US 11,523,701 B2
(45) Date of Patent: Dec. 13, 2022

(54) ACCESSORY FOR STEAM-HEATING AND/OR STEAM-COOKING FOOD AND STEAMER COMPRISING A CONTAINER AND AN ACCESSORY FOR STEAM-HEATING AND/OR STEAM-COOKING FOOD CONTAINED IN THE CONTAINER

(71) Applicant: SEB S.A., Ecully (FR)

(72) Inventors: Olivier Delrue, Selongey (FR); Laurent Guegan, Lornay (FR); Laurent Blond, Beaune (FR)

(73) Assignee: SEB S.A.

( * ) Notice: Subject to any disclaimer, the term of this patent is extended or adjusted under 35 U.S.C. 154(b) by 307 days.

(21) Appl. No.: 16/471,173

(22) PCT Filed: Dec. 18, 2017

(86) PCT No.: PCT/FR2017/053669
§ 371 (c)(1),
(2) Date: Jun. 19, 2019

(87) PCT Pub. No.: WO2018/115696
PCT Pub. Date: Jun. 28, 2018

(65) Prior Publication Data
US 2020/0000262 A1 Jan. 2, 2020

(30) Foreign Application Priority Data
Dec. 20, 2016 (FR) ...................................... 1662882

(51) Int. Cl.
*A47J 27/04* (2006.01)
*A47J 27/00* (2006.01)
*F22B 1/28* (2006.01)

(52) U.S. Cl.
CPC ............. *A47J 27/04* (2013.01); *A47J 27/004* (2013.01); *F22B 1/284* (2013.01); *A47J 2027/043* (2013.01)

(58) Field of Classification Search
CPC .... A47J 27/004; A47J 27/04; A47J 2027/043; F22B 1/284
See application file for complete search history.

(56) References Cited

U.S. PATENT DOCUMENTS 4,509,412 A * 4/1985 Whittenburg ........... A47J 27/04
99/413
4,617,908 A * 10/1986 Miller ...................... A21B 1/24
126/20

(Continued)

FOREIGN PATENT DOCUMENTS

CN 1926380 A 3/2007
CN 104363797 A 2/2015

(Continued)

OTHER PUBLICATIONS

International Search Report as issued in International Patent Application No. PCT/FR2017/053669, dated Mar. 29, 2018.

(Continued)

*Primary Examiner* — Erin E McGrath
(74) *Attorney, Agent, or Firm* — Lerner, David, Littenberg, Krumholz & Mentlik, LLP

(57) ABSTRACT

A steamer accessory for steam-heating and/or steam-cooking food contained in a container carrying the steamer accessory, includes a steam generator including a steam production chamber connected to at least one steam distribution outlet provided in a lower part of the steam generator, the steamer accessory including a bearing surface intended to rest on the container. The bearing surface has an indentation providing a vent capable of bringing the inside of the (Continued)

Figure 1:
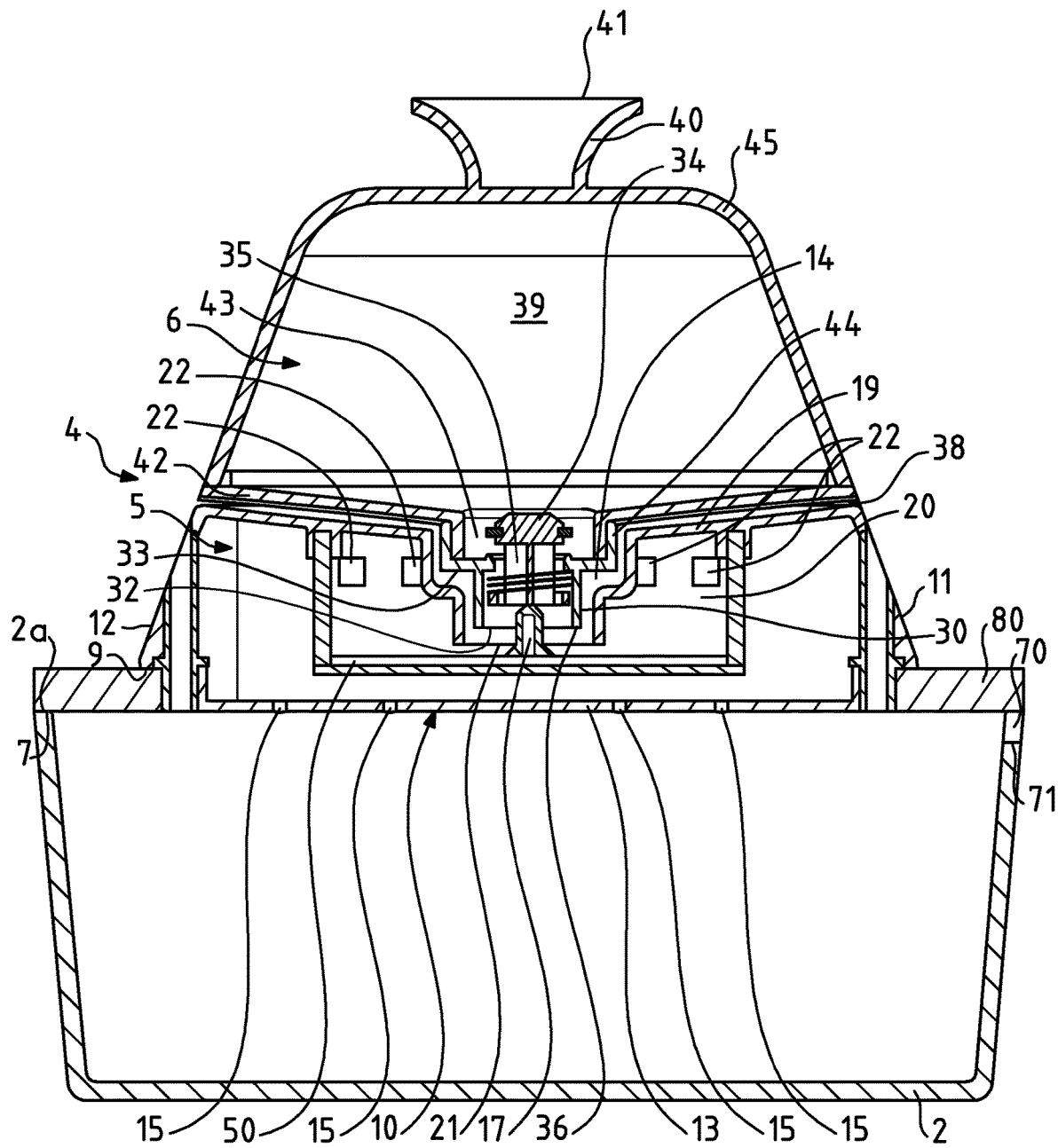

container into communication with the outside of the container when the container is carrying the steamer accessory.

10 Claims, 4 Drawing Sheets

(56) References Cited

U.S. PATENT DOCUMENTS

| | | | |
|---|---|---|---|
| 5,756,968 A | * | 5/1998 | Chung .................... A47J 27/04 219/428 |
| 6,530,308 B1 | | 3/2003 | Lin |
| 2004/0112372 A1 | | 6/2004 | Dumoux et al. |
| 2007/0187388 A1 | | 8/2007 | Yamaguchi et al. |
| 2015/0201788 A1 | | 7/2015 | Douma et al. |
| 2016/0026262 A1 | | 1/2016 | Pesonen et al. |
| 2020/0000262 A1 | | 1/2020 | Delrue et al. |

FOREIGN PATENT DOCUMENTS

| | | | |
|---|---|---|---|
| CN | 105992537 A | 10/2016 | |
| CN | 209661260 U | 11/2019 | |
| DE | 199 07 049 A1 | 8/2000 | |
| DE | 19907049 A1 | 8/2000 | |
| FR | 2 161 447 A5 | 7/1973 | |
| FR | 2161447 A5 | 7/1973 | |
| GB | 2 391 163 A | 2/2004 | |
| GB | 2391163 A | 2/2004 | |
| JP | 2001355844 A | 12/2001 | |
| RU | 2324418 C2 | 5/2008 | |
| WO | 2014013417 A2 | 1/2014 | |
| WO | WO 2014/013417 A2 | 1/2014 | |
| WO | WO-2015087012 A | * 6/2015 | .............. A47J 27/04 |

OTHER PUBLICATIONS

International Search Report including Written Opinion for PCT/FR2017/053669 dated Mar. 29, 2018; 11 pages.
Search Report for French Application No. FR 1662882 dated Aug. 1, 2017; 2 pages.
Search Report for Russian Application No. 2019118739 dated Apr. 21, 2021; 2 pages.
Search Report from First Office Action for Chinese Application No. 201711383913.6 dated Nov. 23, 2020; 8 pages.

* cited by examiner ively, the steam production chamber could comprise the water reservoir. In other words, the steam production chamber then comprises a heating device allowing the water reservoir to be heated as in a boiler, for example.

ACCESSORY FOR STEAM-HEATING AND/OR STEAM-COOKING FOOD AND STEAMER COMPRISING A CONTAINER AND AN ACCESSORY FOR STEAM-HEATING AND/OR STEAM-COOKING FOOD CONTAINED IN THE CONTAINER

CROSS REFERENCE TO RELATED APPLICATIONS

This application is the U.S. National Stage of PCT/FR2017/053669, filed Dec. 18, 2017, which in turn claims priority to French Patent Application No. 1662882 filed Dec. 20, 2016, the entire contents of all applications are incorporated herein by reference in their entireties.

This invention concerns the technical field of steam production apparatuses and devices for steam-heating and/or steam-cooking food.

More specifically, this invention concerns electric steamers comprising a container and a steamer accessory arranged on the container for steam-heating and/or steam-cooking food contained in the container.

This invention also concerns steamer accessories arranged on a container for steam-heating and/or steam-cooking food contained in the container.

This invention also concerns apparatuses for steam-heating and/or steam-cooking food, comprising a container associated with a steam production device forming such a steamer accessory.

From the document U.S. Pat. No. 6,530,308 we know of a steamer accessory comprising a steam generator comprising a steam production chamber comprising a heating device, the steam production chamber being connected to at least one steam distribution outlet provided in a lower part of the steam generator. This arrangement allows steam to be injected into a cooking enclosure arranged below the steam generator. The steam production chamber is supplied with water by means of a drop control device. However, this device is more suited to a one-off injection of steam into a grill than for heating or cooking food with steam.

One objective of this invention is to propose an electric steamer for steam-heating and/or steam-cooking food comprising a container and a steamer accessory, and which allows the escape of steam to be controlled.

Another objective of this invention is to propose an electric steamer for steam heating and/or steam-cooking food comprising a container and a steamer accessory, and which is suited to different sizes of containers.

Another objective of this invention is to propose an electric steamer for steam-heating and/or steam-cooking food comprising a container and a steamer accessory, and which is economical to construct.

Another objective of this invention is to propose a steamer accessory used with a container for steam-heating and/or steam-cooking food, and which makes allows the escape of steam to be controlled.

Another objective of this invention is to propose a steamer accessory used with a container for steam heating and/or steam-cooking food, and which is suited to different sizes of containers.

Another objective of this invention is to propose a steamer accessory used with a container for steam heating and/or steam-cooking food, and which is economical to construct.

These objectives are achieved with a steamer accessory for steam-heating and/or steam-cooking food contained in a container carrying the steamer accessory, the steamer accessory comprising a steam generator comprising a steam production chamber connected to at least one steam distribution outlet provided in a lower part of the steam generator, the steamer accessory comprising a bearing surface intended to rest on the container, because the bearing surface has an indentation providing a vent capable of bringing the inside of the container into communication with the outside of the container when the container is carrying the steamer accessory. Thus, the container used may be lacking a specific conformation intended to provide the vent at least in part. The vent formed by the indentation is easier to clean than a conduit passing through the steamer accessory.

Advantageously then, the steamer accessory comprises a ring carrying and surrounding the steam generator, and the vent is provided in the ring. The same type of steam generator can thus be assembled with different sizes of rings. This arrangement facilitates adapting the steamer accessory to different sizes of containers.

Advantageously then, the ring is removable from the steam generator. The same type of steam generator can thus be used with different sizes of rings.

Advantageously again, the steamer accessory comprises a water reservoir. Such an embodiment is well suited to a household appliance.

Advantageously then, the water reservoir is carried by the ring.

Advantageously again, the steamer accessory comprises a water reservoir supplying the steam production chamber with water. This arrangement allows a smaller quantity of water to be heated, which helps obtain steam more quickly. Alternatively, the steam production chamber could comprise the water reservoir. In other words, the steam production chamber then comprises a heating device allowing the water reservoir to be heated as in a boiler, for example.

According to one embodiment, the water reservoir is removable from the steam generator and the steam generator carries the removable water reservoir. This arrangement facilitates the filling of the water reservoir.

Advantageously again, the steam generator has a lower wall in which is formed the said at least one steam distribution outlet, and the steam production chamber is arranged in the steam generator away from the lower wall. These arrangements allow having a steam distribution chamber beneath the steam production chamber, which allows more freedom in the arrangement of the steam distribution outlets.

Advantageously again, the steam generator has an external side wall and the steam production chamber is arranged in the steam generator away from the external side wall. These arrangements permit limiting the temperature of the external side wall of the steam generator.

These objectives are also achieved with an electric steamer comprising a container to contain the food to be heated and/or cooked, and a steamer accessory intended to rest on the container for steam-heating and/or steam-cooking the food contained in the container, because the steamer accessory conforms to at least one of the aforementioned characteristics.

These objectives are also achieved with an electric steamer comprising a container to contain the food to be heated and/or cooked and a steamer accessory for steam-heating and/or steam-cooking the food contained in the container, the container carrying the steamer accessory, the steamer accessory comprising a steam generator comprising a steam production chamber connected to at least one steam distribution outlet provided in a lower part of the steam generator, because the container provides, if desired, with the steamer accessory, at least one vent bringing the inside of the container into communication with the outside of the container.

In other words, the said vent can be provided either in a wall of the container, or between the container and the steamer accessory. In this way, several containers can be used with the steamer accessory, the vent or vents being adapted to the size of the container used. This arrangement facilitates the use of the steamer accessory with different containers. This arrangement also allows better control of the escape of steam from the enclosure formed by the steamer accessory and the container used with the steamer accessory.

Advantageously, the steamer accessory comprises a ring surrounding and carrying the steam generator, and the ring rests on the container. The same type of steam generator can thus be assembled with different sizes of rings. This arrangement facilitates adapting the steamer accessory to different sizes of containers.

Advantageously then, the ring is removable from the steam generator. This arrangement allows different rings to be used with the same steam generator.

According to one embodiment, the said vent is provided between the container and the steamer accessory. This arrangement simplifies the embodiment of the container. However, the container and the steamer accessory do not necessarily each have an indentation providing a portion of the vent.

Advantageously then, the said vent is provided in the steamer accessory. This arrangement allows the use of containers that are lacking a specific conformation for providing the vent.

Advantageously then, the steamer accessory comprises a ring and the said vent is provided in the ring. This arrangement allows different types of rings to be used with the same type of steam generator.

Advantageously again, the said vent is provided in an upper edge of the container. This arrangement allows the size of the vent to be adapted to the size of the container.

Alternatively, the vent can be delimited at the same time by the steamer accessory and by the container, in particular at the same time by the ring and by the container.

According to another embodiment, the said vent is provided in a side wall of the container. This arrangement allows the said vent to be adapted to the capacity of the container.

Advantageously then, a perforated support is arranged in the container above and away from a bottom of the container. This arrangement makes it possible to collect condensate below the perforated support carrying the food.

Advantageously then, the perforated support extends above the said vent. This arrangement allows better permeation of the food by the steam.

Advantageously again, the steamer accessory comprises a water reservoir. Such an embodiment is well suited to a household appliance.

Advantageously then, the water reservoir is carried by the ring.

Advantageously again, the steamer accessory comprises a water reservoir supplying the steam production chamber with water. This arrangement allows a smaller quantity of water to be heated, which helps obtain steam more quickly. Alternatively, the steam production chamber could comprise the water reservoir. In other words, the steam production chamber then comprises a heating device allowing the water reservoir to be heated as in a boiler, for example.

According to one embodiment, the water reservoir is removable from the steam generator, and the steam generator carries the removable water reservoir. This arrangement facilitates the filling of the water reservoir.

Advantageously again, the steam generator has a lower wall in which is formed the said at least one steam distribution outlet, and the steam production chamber is arranged in the steam generator away from the lower wall. These arrangements allow having a steam distribution chamber beneath the steam production chamber, which allows more freedom in the arrangement of the steam distribution outlets.

Advantageously again, the steam generator has an external side wall and the steam production chamber is arranged in the steam generator away from the external side wall. These arrangements permit limiting the temperature of the external side wall of the steam generator.

Figure 2:
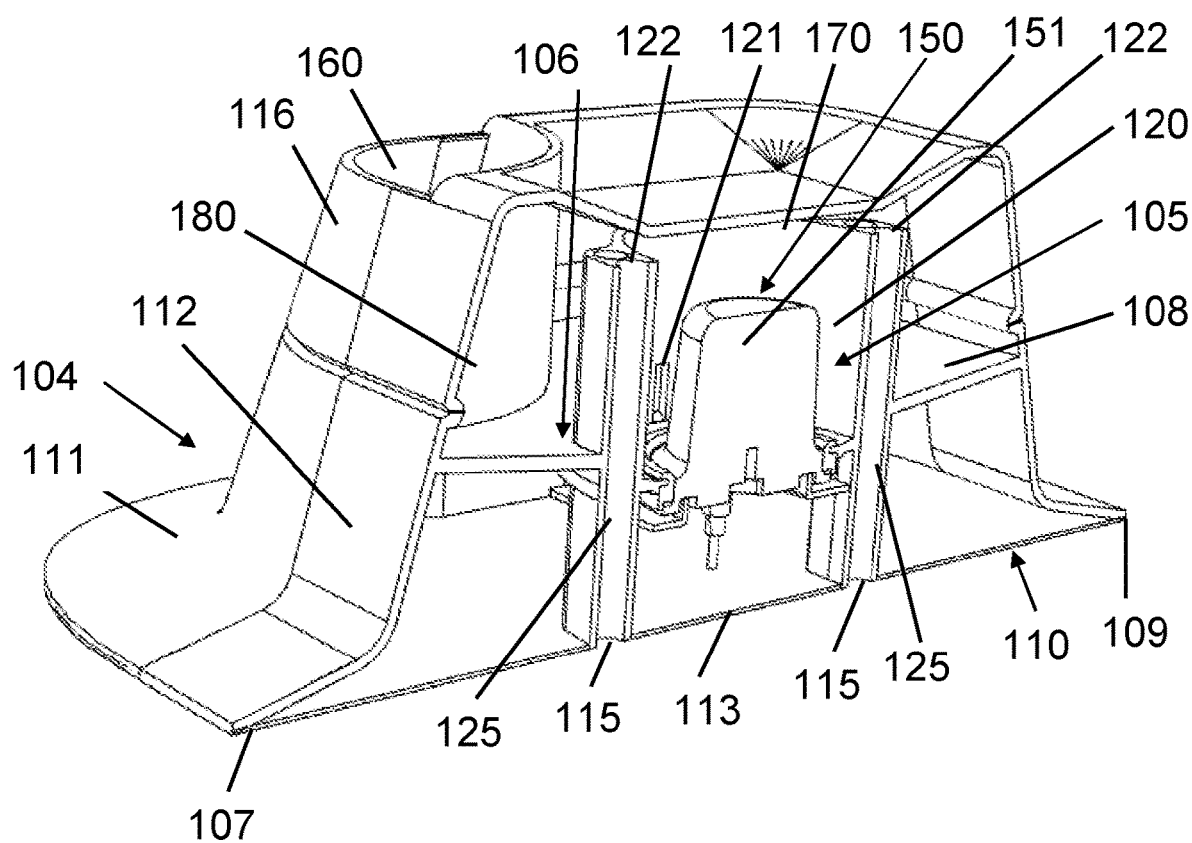
Figure 3:
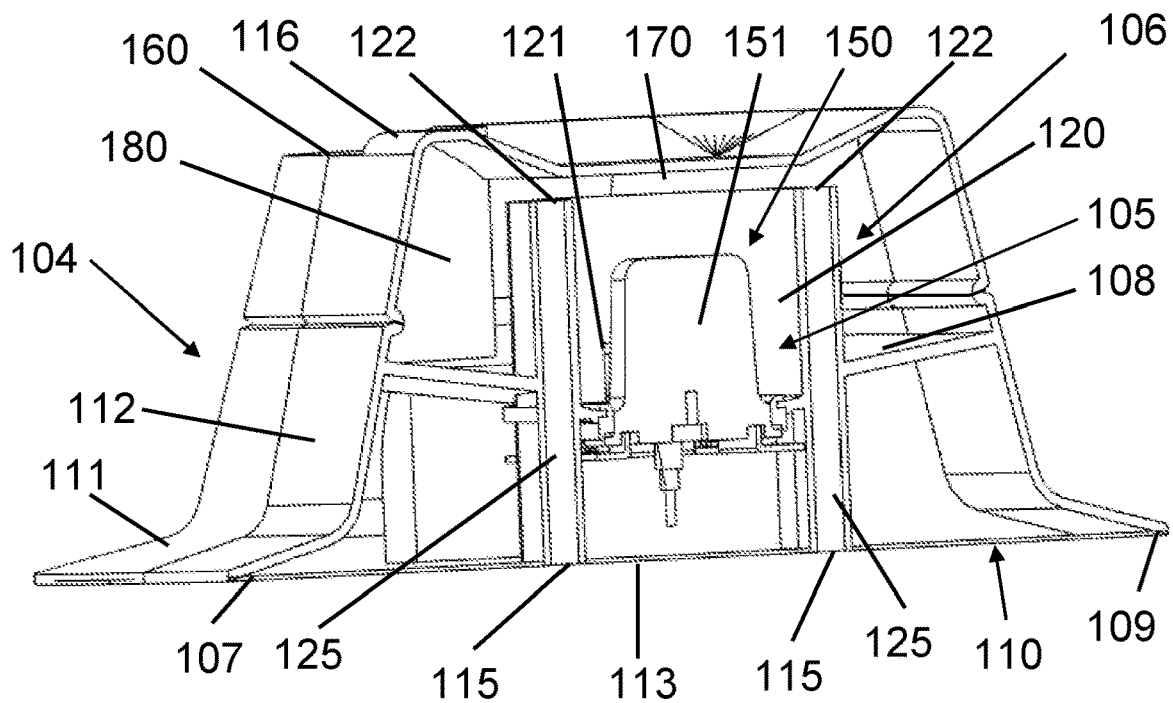
Figure 4:
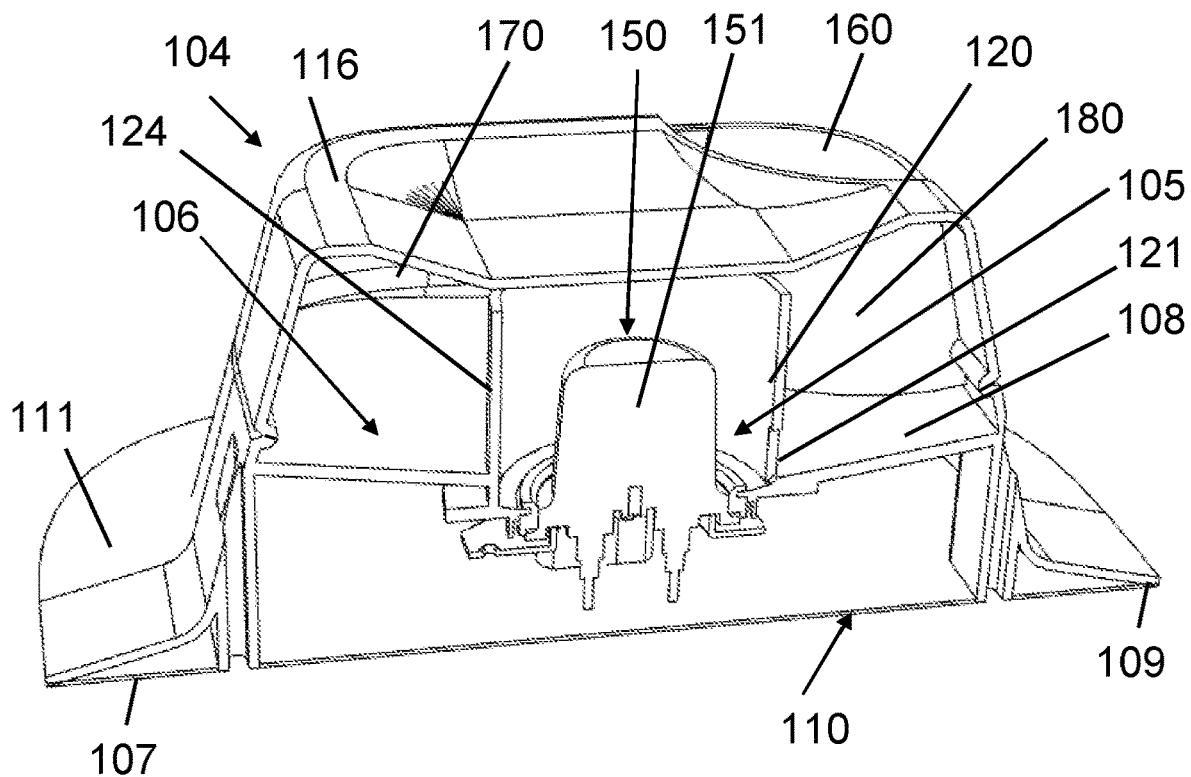
Figure 5:
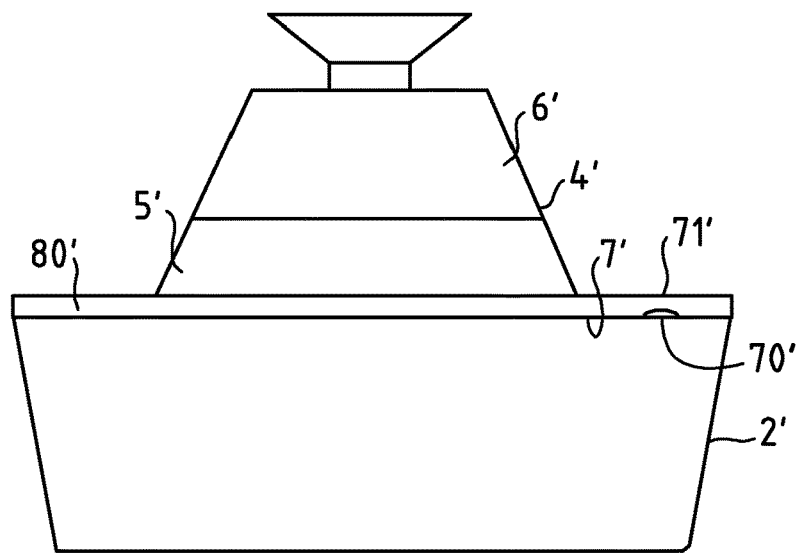
Figure 6:
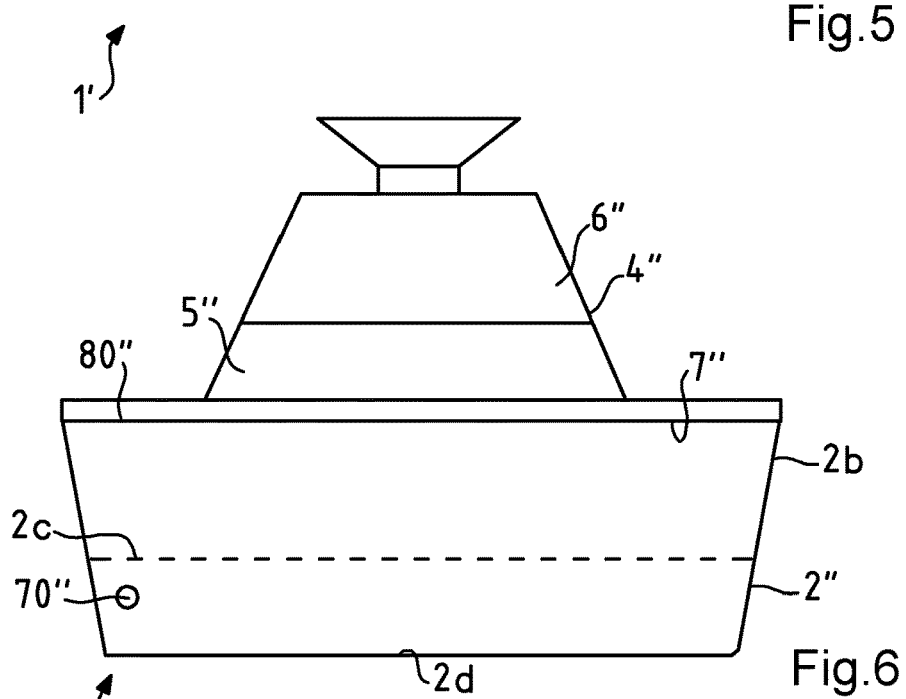
Figure 7:
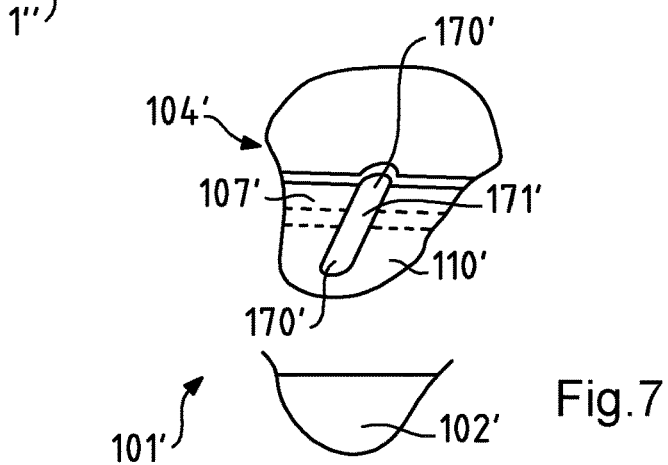

The invention will be more fully understood in consideration of four embodiment examples, which are in no way restrictive, illustrated in the attached FIGS. 1 to 7, in which:

FIG. 1 is a schematic and cross-sectional elevation view of a first embodiment example of a steamer according to the invention, comprising a first embodiment of a heating part, FIG. 2 is a perspective cross-sectional view of a second embodiment of a heating part of a steamer, FIG. 3 is a perspective cross-sectional view of the heating part illustrated in FIG. 2, according to another orientation, FIG. 4 is a perspective cross-sectional view of the heating part illustrated in FIGS. 2 and 3, according to another cross section FIG. 5 is a schematic elevation view of a second embodiment example of a steamer according to the invention, FIG. 6 is a schematic elevation view of a third embodiment example of a steamer according to the invention, FIG. 7 is a partial perspective view of a fourth embodiment example of a steamer according to the invention.

FIG. 1 illustrates an embodiment example of an electric steamer 1 comprising a container 2 for containing the food to be heated and/or cooked and a steamer accessory 4 for steam-heating and/or steam-cooking the food contained in the container 2. The container 2 carries the steamer accessory 4. The steamer accessory 4 comprises a steam generator 5.

Thus, as represented in FIG. 1, the steamer accessory 4 comprises a bearing surface 7 intended to rest on the container 2.

More specifically in the embodiment example illustrated in FIG. 1, the steamer accessory 4 comprises a ring 80 surrounding and carrying the steam generator 5. The ring 80 rests on the container 2. Thus, the ring 80 comprises the bearing surface 7. If desired, the ring 80 can be removable from the steam generator 5.

The container 2 provides with the steamer accessory 4 a vent 70 bringing the inside of the container 2 into communication with the outside of the container 2, to allow the steam to escape from the container 2.

More specifically, in the embodiment example illustrated in FIG. 1, the vent 70 is provided in an upper edge 2a of the container 2. Thus, the steamer accessory 4 may be lacking a specific conformation intended to provide the vent 70 at least in part.

In this regard, the upper edge 2a of the container 2 has an indentation 71 delimiting the vent 70 with a lower part of the ring 80. The indentation 71 is an upper indentation. Alternatively or in addition, the indentation 71 could be formed by an outer protuberance of the side wall of the container 2.

As visible on FIG. 1, the steamer accessory 4 comprises the steam generator 5 and a water reservoir 6. The water reservoir 6 is removable from the steam generator 5 and the steam generator 5 carries the removable water reservoir 6. The steam generator 5 comprises a water inlet 14 supplied with water by the water reservoir 6 arranged on the steam generator 5. The steam generator 5 comprises a steam production chamber 20. The water reservoir 6 supplies the steam production chamber 20 with water. In this regard, the steam production chamber 20 has a water supply inlet 21 supplied with water by the water reservoir 6 arranged on the steam generator 5. The steam production chamber 20 comprises a heating device 50 to transform the water in the steam production chamber 20 into steam. The steam production chamber 20 has at least one steam exhaust outlet 22. The steam production chamber 20 is connected to at least one steam distribution outlet 15 provided in a lower part 10 of the steam generator 5. The bearing surface 7 extends around the said at least one steam distribution outlet 15.

More specifically, the steam generator 5 has an annular lower bearing surface 9 intended to rest on the ring 80. The water inlet 14 of the steam generator 5 is arranged in an upper face 19 of the steam generator 5. The water inlet 14 forms a funnel. The water inlet 14 discharges to the water supply inlet 21 of the steam production chamber 20. The steam generator 5 has a lower wall 13 in which is formed the said at least one steam distribution outlet 15. The steam generator 5 has an external side wall 12 extending below the water reservoir 6 arranged on the steam generator 5.

In the embodiment example illustrated in FIG. 1, the heating device 50 is arranged in the bottom of the steam production chamber 20. The heating device 50 may in particular comprise a screen-printed heating element, or a reinforced heating element arranged under a heat diffusion plate and/or in a heat diffusion plate. As a variant, the heating device 50 could in particular be arranged inside the steam production chamber 20.

According to a preferred embodiment, the steam production chamber 20 has at least one steam exhaust outlet 22, positioned higher than the water supply inlet 21, the said at least one steam exhaust outlet 22 communicating with the said at least one steam distribution outlet 15.

In the embodiment example illustrated in FIG. 1, the steam production chamber 20 has several steam exhaust outlets 22 positioned higher than the water supply inlet 21 and communicating with the steam distribution outlets 15. The steam production chamber 20 is arranged in the steam generator 5 away from the lower wall 13, which allows more freedom in the position of the steam distribution outlets 15. The steam production chamber 20 is arranged in the steam generator 5 away from the external side wall 12. The lower part 10 forms the lower wall 13.

The water reservoir 6 comprises a drain outlet 32 supplying the steam generator 5 with water.

In the embodiment example illustrated in FIG. 1, the steamer accessory 4 comprises at least one airway 38 bringing the drain outlet 32 into communication with the outside when the water reservoir 6 is arranged on the steam generator 5. As is clearly visible in FIG. 4, the said at least one airway 38 is provided between the water reservoir 6 and the steam generator 5, more specifically between a lower face 33 of the water reservoir 6 and the upper face 19 of the steam generator 5. The water reservoir 6 and/or the steam generator 5 may for this purpose have spacers (not pictured in FIG. 1) to separate the lower face 33 of the water reservoir 6 from the upper face 19 of the steam generator 5. As a variant, the said at least one airway 38 may in particular be provided in the water reservoir 6 and/or in the steam generator 5.

In the embodiment example illustrated in FIG. 1, the drain outlet 32 is arranged in the lower face 33 of the water reservoir 6. The lower part of the water reservoir 6 rests on the upper part of the steam generator 5.

More specifically, the drain outlet 32 extends above the water supply inlet 21 of the steam production chamber 20. The drain outlet 32 presents a valve 34 that can move between a closed position in which the drain outlet 32 is closed and a drainage position in which the drain outlet 32 allows the water to flow out of the water reservoir 6. Preferably, the water reservoir 6 comprises at least one bearing surface 36 extending below the valve 34 positioned in the closed position, to prevent inadvertent actions of the valve 34. According to a preferred embodiment, the valve 34 is surrounded by a conduit 30 extending below the valve 34 positioned in the closed position.

In the embodiment example illustrated in FIG. 1, the steam generator 5 has a lug 17 pushing the valve 34 toward the drainage position when the water reservoir 6 is arranged on the steam generator 5. As visible in FIG. 1, the lug 17 is arranged in the steam production chamber 20. The valve 34 is able to move in a principally vertical direction. The valve 34 is pushed toward the closed position by an elastic return element 35. The elastic return element 35 is advantageously formed by a helical spring. The bearing surface 36 is formed by the drain outlet 32. As a variant, the valve 34 may have a lug pushed by the steam production chamber 20 when the water reservoir 6 is arranged on the steam generator 5.

According to a preferred embodiment, the water reservoir 6 may be positioned on the steam generator 5 according to several angular orientations. In the embodiment example illustrated in FIG. 1, the water reservoir 6 may be positioned on the steam generator 5 without special indexing. More specifically, the water inlet 14 is arranged in the central part of the upper face 19 of the steam generator 5.

According to a preferred embodiment, the water reservoir 6 comprises a gripping device 40. In the embodiment example illustrated in FIG. 1, the gripping device 40 is arranged opposite the drain outlet 32. The gripping device 40 has a bearing surface 41 designed to hold the water reservoir 6 when the water reservoir 6 is positioned upside-down.

The water reservoir 6 may be made in two assembled parts, which can be dismountable if desired, in particular for filling and/or for cleaning. In the embodiment example illustrated in FIG. 1, the lower face 33 of the water reservoir 6 is formed of a base 42 comprising an orifice 43 around which is mounted a stopper 44 presenting the drain outlet 32. The stopper 44 houses the valve 34. A body 45 is mounted on the base 42. The gripping device 40 comes out of the body 45. The body 45 may be assembled such that it may or may not be dismountable from the base 42. As a variant, the gripping device 40 may in particular come out of the base 42, or be connected or fixed on the body 45 or on the base 42. The water reservoir 6 may comprise a filling orifice separate from the drain outlet 32. If desired, the filling orifice may be closed.

The electric steamer 1 illustrated in FIG. 1 operates and is used as follows.

The user places the food to be heated or cooked into the container 2 and then positions the steamer accessory 4 on the container 2 after having filled the water reservoir 6. The user may fill the water reservoir 6 for example by removing the base 42 from the body 45 after having turned over the water reservoir 6. The user then places the base 42 back on the body 45 and again turns over the water reservoir 6 to position the water reservoir 6 on the steam generator 5. The drain outlet 32 of the water reservoir 6 then extends into the water inlet 14 of the steam generator 5. The valve 34 is pushed toward the drainage position by the steam generator 5 when the water reservoir 6 is arranged on the steam generator 5. The lug 17 then extends inside the conduit 30 and pushes the valve 34 toward the drainage position, such that the water coming from the drain outlet 32 of the water reservoir 6 flows into the water inlet 14 of the steam generator 5 to reach the drain outlet 32 of the water reservoir 6. The water level rises in the steam production chamber 20 until it reaches the drain outlet 32. The water reservoir 6 positioned on the steam generator 5 forms a closed chamber 39 above the drain outlet 32. The water cannot flow out of the water reservoir 6 unless air takes its place. In this regard, the drain outlet 32 communicating with the outside of the steamer accessory 4 through the airway 38 allows air to enter the water reservoir 6, as long as the water level does not reach the drain outlet 32.

The user then turns on the heating device 50. The temperature of the water in the steam production chamber rises until steam is produced. The steam then escapes via the steam exhaust outlets 22 to reach the steam distribution outlets 15 and expand in the container 2 to cook or heat the food in the container 2. The air above the food can escape through the vent 70. The production of steam leads the water level in the steam production chamber 20 to drop below the drain outlet 32, which allows the steam production chamber 20 to be resupplied with water. The water can then drain from the water reservoir 6 via the drain outlet 32, until the water level reaches the drain outlet 32, with air from the outside of the steamer accessory 4 passing through the airway 38 to enter the water reservoir 6 through the drain outlet 32.

When the food in the container 2 is saturated with steam, the steam escapes through the vent 70.

The water reservoir 6 supplies water to the steam production chamber 20 by gravity. In other words, the water flows from the water reservoir 6 to supply the steam production chamber 20.

As a variant, the water reservoir 6 does not necessarily have a valve 34. The drain outlet 32 of the water reservoir 6 may in particular be calibrated so that the water flow entering the steam production chamber 20 allows the water in the steam production chamber 20 to vaporize without water overflowing from the steam production chamber 20.

As a variant, the water inlet 14 and the water supply inlet 21 may be combined.

As a variant, the water reservoir 6 may be locked by bayonet closure on the steam generator 5. In this regard, the water reservoir 6 may, for example, comprise tabs provided for fastening by rotation to the steam generator, or vice versa.

As a variant, the steamer accessory 4 may comprise a pump to control the flow of water out of the water reservoir 6 in order to supply the steam production chamber 20. To simplify the electrical connections, the pump may advantageously be arranged in the steam generator 5.

As a variant, the ring 80 may carry the steam generator 5.

As a variant, the steamer accessory 4 does not necessarily have a ring 80.

FIGS. 2 to 4 illustrate another embodiment of a steamer accessory 104 intended for steam-heating and/or steam-cooking food contained in a container (not represented in the figures). The container provides, if desired, with the steamer accessory 104, at least one vent bringing the inside of the container into communication with the outside of the container.

The steamer accessory 104 comprises a bearing surface 107 intended to rest on the container.

The steamer accessory 104 comprises the steam generator 105 and a water reservoir 106.

The water reservoir 106 communicates with the outside via a filling orifice 160. If desired, the water reservoir 106 may have at least one other filling orifice.

The steam generator 105 comprises a steam production chamber 120. The water reservoir 106 supplies water to the steam production chamber 120 by gravity. In this regard, the water reservoir 106 communicates via a water supply inlet 121 with the steam production chamber 120. If desired, the water reservoir 106 may communicate with the steam production chamber 120 through at least one other water supply inlet.

Preferably, the water reservoir 106 has a bottom 108 discharging towards the water supply inlet 121.

In the embodiment illustrated in FIGS. 2 to 4, the water reservoir 106 surrounds the steam production chamber 120. In this regard, an annular wall 124, better visible on FIG. 4, surrounds the steam production chamber 120. The water supply inlet 121 is formed in the annular wall 124.

The steam production chamber 120 comprises a heating device 150 to transform the water in the steam production chamber 120 into steam. In the embodiment illustrated in FIGS. 2 to 4, the heating device 150 comprises a heating pad 151. As a variant, the heating device 150 may in particular comprise a heating element arranged under a heat diffusion plate and/or in a heat diffusion plate forming at least a part of the bottom of the steam production chamber 120. If desired, the steam production chamber 120 may comprise several heating devices.

The steam production chamber 120 is connected to at least one steam distribution outlet 115 provided in a lower part 110 of the steam generator 105. In this regard, the steam production chamber 120 communicates with at least one steam evacuation outlet 122 arranged higher than the water supply inlet 121. The steam production chamber 120 is confined above the steam evacuation outlet(s) 122. The or each steam evacuation outlet 122 communicates via a conduit 125 with the or one of the steam distribution outlet(s) 115.

More specifically, in the embodiment illustrated in FIGS. 2 to 4, the steam production chamber 120 communicates with the steam evacuation outlet(s) 122 via a steam expansion chamber 170 arranged above the steam production chamber 120. In other words, the said steam expansion chamber has no communication with the outside above the said at least one steam evacuation outlet 122. A separating side wall 180 is arranged between the filling orifice 160 and the steam expansion chamber 170 in order to prevent steam from escaping from the filling orifice 160. In this regard, the separating side wall 180 extends lower than the steam evacuation outlet(s) 122. In other words, the separating side wall 180 extends below the steam evacuation outlet(s) 122. More specifically, the separating side wall 180 extends lower than the water supply inlet 121. As is clearly visible in FIGS. 2 to 4, the separating side wall 180 extends into the water reservoir 106. In other words, the water may reach the two faces of the lower part of the separating side wall 180.

In the embodiment illustrated in FIGS. 2 to 4, the steam production chamber 120 has several steam evacuation outlets 122 arranged higher than the water supply inlet 121 and communicating via several conduits 125 with the steam distribution outlets 115. More specifically, the conduits 125 are provided in the annular wall 124. Two groups of three conduits 125 are arranged on both sides of the heating pad 151. The conduits 125 are vertical. As a variant, the conduits 125 may be descending without necessarily being vertical. Preferably, the conduits 125 do not have baffles. In other words, the conduits 125 are descending in a continuous manner, without necessarily being straight.

More specifically, the steam generator 105 has an annular lower bearing surface 109 intended to rest on a container (not represented) adapted to the geometry of the steam generator 105. Thus, the steam generator 105 comprises the bearing surface 107.

The steam generator 105 has a lower wall 113 in which is/are formed the steam distribution outlet(s) 115. The steam production chamber 120 is arranged in the steam generator 105 away from the lower wall 113, which allows more freedom in the position of the steam distribution outlets 115. As visible on FIGS. 3 and 4, the bearing surface 107 extends around the steam distribution outlets 115.

The steam generator 105 has an external side wall 112. The bottom 108 of the water reservoir 106 connects the external side wall 112 to the annular wall 124. The steam production chamber 120 is arranged in the steam generator 105 away from the external side wall 112.

The steamer accessory 104 has a top wall 116 advantageously made of transparent or translucent material. The top wall 116 is assembled with the external side wall 112, for example by clipping, bonding, overmoulding, screwing or welding. The top wall 116 forms a part of the water reservoir 106. The separating side wall 180 comes out of the top wall 116. The top wall 116 forms the upper part of the steam expansion chamber 170.

Thus, the steamer accessory 104 illustrated in FIGS. 2 to 4 is lacking a specific conformation intended to provide a vent at least in part.

The steamer accessory 104 illustrated in FIGS. 2 to 4 functions and is used in the following manner.

The user places the steamer accessory 104 on the said container after having placed the food in the said container. The user fills the water reservoir 106 through the filling orifice 160. The water flows through the water supply inlet 121 into the steam production chamber 120. Preferably, the user fills the water reservoir 106 to a level sufficiently lower than the steam evacuation outlets 122 to prevent the water from reaching the steam evacuation outlets 122 and flowing through the conduits 125. The user then turns on the heating device 150. The temperature of the water in the steam production chamber 120 rises until steam is produced. The steam rises from the steam production chamber 120 to reach the steam expansion chamber 170. The steam is then confined by the top wall 116, by the separating side wall 180 and by the water in the water reservoir 106. The steam then escapes via the steam evacuation outlets 122 to reach the steam distribution outlets 115 by descending through the conduits 125. The steam exiting the steam distribution outlets 115 spreads through the container.

The air above the food can escape through the vent. When the food in the container is saturated with steam, the steam escapes through the vent.

As a variant, the steamer accessory 104 could comprise a ring carrying the steam generator 105.

The electric steamer 1' illustrated in FIG. 5 comprises a container 2' providing with a steamer 4' a vent 70' bringing the inside of the container 2' into communication with the outside of the container 2'. The steamer accessory 4' comprises a steam generator 5' which may be similar to the steam generator 5. The steamer accessory 4' is intended for steam-heating and or steam-cooking food contained in the container 2' carrying the steamer accessory 4', as represented in FIG. 5.

Thus, as represented in FIG. 5, the steamer accessory 4' comprises a bearing surface 7' intended to rest on the container 2'.

More specifically in the embodiment example illustrated in FIG. 5, the steamer accessory 4' comprises a ring 80' surrounding and carrying the steam generator 5'. The ring 80' rests on the container 2'. Thus, the ring 80' comprises the bearing surface 7'. If desired, the ring 80' can be removable from the steam generator 5'.

The electric steamer 1' illustrated in FIG. 5 differs from the electric steamer 1 illustrated in FIG. 1 in that the vent 70' is provided in the steamer accessory 4'. Thus, the container 2' may be lacking a specific conformation intended to provide the vent 70' at least in part.

More specifically, in the embodiment example illustrated in FIG. 5, the vent 70' is provided in the ring 80'. The ring 80' has an indentation 71'.

As represented in FIG. 5, the bearing surface 107' has the indentation 71'. The indentation 71' forms the vent 70' capable of bringing the inside of the container 2' into communication with the outside of the container 2' when the container 2' is carrying the steamer accessory 4'. Thus, when the container 2' is saturated with steam, the excess steam can escape from the container 2' through the vent 70'.

As is clearly visible in FIG. 5, the vent 70' is arranged in a lower part of the ring 80'. In this regard, the indentation 71' delimits the vent 70' with the upper edge of the container 2'. The indentation 71' is thus a lower indentation. Alternatively or in addition, the indentation 71' could be a side indentation leaving a portion of the upper edge of the container 2' free.

As a variant, the steamer accessory 4' does not necessarily have a ring 80'. The vent 70' can then in particular be provided in the steam generator 5'.

The electric steamer 1" illustrated in FIG. 6 comprises a steamer accessory 4" as well as a container 2" providing a vent 70" bringing the inside of the container 2" into communication with the outside of the container 2". The steamer accessory 4" comprises a steam generator 5" which may be similar to the steam generator 5.

Thus, as represented in FIG. 6, the steamer accessory 4" comprises a bearing surface 7" intended to rest on the container 2".

More specifically in the embodiment example illustrated in FIG. 6, the steamer accessory 4" comprises a ring 80" surrounding and carrying the steam generator 5". The ring 80" rests on the container 2". If desired, the ring 80" can be removable from the steam generator 5".

The electric steamer 1" illustrated in FIG. 6 differs from the electric steamer 1 illustrated in FIG. 1 in that the vent 70" is provided in a side wall 2b of the container 2". Thus, the steamer accessory 4" may also be lacking a specific conformation intended to provide the vent 70" at least in part.

More specifically, in the embodiment example illustrated in FIG. 6, a perforated support 2c is arranged in the container 2" away from a bottom 2d of the container 2". The perforated support 2c extends over the vent 70". Thus, the steam must pass through the perforated support 2c carrying the food before reaching the vent 70", which promotes good permeation of the food by the steam.

As a variant, the steamer accessory 4" does not necessarily have a ring 80".

The electric steamer 101' partially illustrated in FIG. 7 comprises a steamer accessory 104' and a container 102'. The steamer accessory 104' is intended for steam-heating and or steam-cooking food contained in the container 102' carrying the steamer accessory 104'. The container 102' provides with the steamer accessory 104' a vent 170' bringing the inside of the container 102' into communication with the outside of the container 102'.

As represented in FIG. 7, the steamer accessory 104' comprises a bearing surface 107' intended to rest on the container 102'.

The steamer accessory 104' comprises a steam generator, which may be similar to the steam generator 105. The steamer accessory 104' is lacking a ring carrying the steam generator. The steam generator comprises the bearing surface 107'.

The electric steamer 104' illustrated in FIG. 7 differs from the steamer accessory 104 illustrated in FIGS. 2 to 4 in that the vent 170' is provided in the steamer accessory 104'. Thus, the container 102' may be lacking a specific conformation intended to provide the vent 170' at least in part. In this regard, the bearing surface 107' has an indentation 171' providing the vent 170' capable of bringing the inside of the container 102' into communication with the outside of the container 102' when the container 102' is carrying the steamer accessory 104'.

As represented in FIG. 7, the indentation 171' is a lower indentation. Alternatively or in addition, the indentation 171' could be a side indentation leaving a portion of the upper edge of the container 102' free.

As a variant, the steamer accessory 104' could comprise a ring carrying the steam generator. The vent 170' can then in particular be provided in the ring.

As a variant, the container 2; 2'; 2" may provide, if desired, with the steamer accessory 4; 104; 4'; 4", at least one vent 70; 70'; 70" bringing the inside of the container 2; 2'; 2" into communication with the outside of the container 2; 2'; 2".

As a variant, the steam generator 5; 105 may have at least one vent bringing the lower part 10; 110 of the steam generator 5; 105; 5'; 5" into communication with an external part 11; 111 of the steam generator 5; 105; 5'; 5".

This invention is in no way limited to the embodiment examples described and their variants, but encompasses many modifications in the context of the claims.

The invention claimed is:

1. A steamer accessory for steam-heating or steam-cooking food contained in a container carrying the steamer accessory, the steamer accessory comprising:

a steam generator comprising a steam production chamber connected to at least one steam distribution outlet provided in a lower part of the steam generator, a bearing surface configured to rest on the container, wherein the bearing surface has an indentation providing a vent capable of bringing an inside of the container into communication with an outside of the container and outside of the steamer accessory when the container is carrying the steamer accessory; and a ring surrounding and carrying the steam generator, wherein the steam generator has a lower wall in which is formed the at least one steam distribution outlet and wherein the steam production chamber is arranged in the steam generator away from the lower wall, and wherein the steam production chamber has a water supply inlet configured to receive water and a steam exhaust outlet positioned higher than the water supply inlet, said steam exhaust outlet communicating with the at least one steam distribution outlet.

2. The steamer accessory according to claim 1, wherein the ring comprises the bearing surface and the vent is provided in the ring.

3. The steamer accessory according to claim 2, wherein the ring is removable from the steam generator.

4. The steamer accessory according to claim 1 comprising a water reservoir.

5. The steamer accessory according to claim 4, wherein the water reservoir is carried by the ring.

6. The steamer accessory according to claim 4, wherein the water reservoir supplies the steam production chamber with water.

7. The steamer accessory according to claim 4, wherein the water reservoir is removable from the steam generator and wherein the steam generator carries the removable water reservoir.

8. The steamer accessory according to claim 4, wherein the steam production chamber comprises the water reservoir.

9. The steamer accessory according to claim 1, wherein the steam generator has an external side wall and wherein the steam production chamber is arranged in the steam generator away from the external side wall.

10. An electric steamer comprising a container to contain food to be heated or cooked, and a steamer accessory configured to rest on the container for steam-heating or steam-cooking the food contained in the container, wherein the steamer accessory is according to claim 1.

* * * * *